United States Patent [19]

Kramer

[11] Patent Number: 5,357,415
[45] Date of Patent: Oct. 18, 1994

[54] SWITCHING REGULATOR HAVING AT LEAST ONE REGULATED OUTPUT VOLTAGE

[75] Inventor: Karl-Heinz Kramer, Geretsried, Fed. Rep. of Germany

[73] Assignee: Siemens Aktiengesellschaft, Munich, Fed. Rep. of Germany

[21] Appl. No.: 100,243

[22] Filed: Aug. 2, 1993

[30] Foreign Application Priority Data

Aug. 5, 1992 [EP] European Pat. Off. ........ 92113375.7

[51] Int. Cl.$^5$ ..................... H02M 3/335; G05F 1/40
[52] U.S. Cl. ..................................... 363/21; 323/282
[58] Field of Search ............. 363/20, 21, 74, 80, 363/95, 97, 131; 323/282, 284, 285, 288

[56] References Cited

U.S. PATENT DOCUMENTS

| | | | |
|---|---|---|---|
| 4,672,518 | 6/1987 | Murdock | 363/21 |
| 4,772,995 | 9/1988 | Gautherin et al. | 363/21 |
| 4,876,636 | 10/1989 | Rilly et al. | 363/21 |
| 4,975,820 | 12/1990 | Szepesi | 363/21 |
| 5,041,956 | 8/1991 | Marinus | 363/21 |
| 5,276,604 | 1/1994 | Messman | 363/21 |

FOREIGN PATENT DOCUMENTS

| | | | |
|---|---|---|---|
| 0302433 | 2/1989 | European Pat. Off. | 363/21 |
| 0415244 | 3/1991 | European Pat. Off. | 363/21 |
| WO91/16756 | 10/1991 | PCT Int'l Appl. | 363/21 |

*Primary Examiner*—Steven L. Stephan
*Assistant Examiner*—Matthew Nguyen
*Attorney, Agent, or Firm*—Hill, Steadman & Simpson

[57] ABSTRACT

A switching regulator having a power switch arranged in a main circuit of the primary side in series with a current-measuring resistor and having a delta voltage source in series with the current-measuring resistor. The delta voltage source can be realized in a simple manner in that the current-measuring resistor is arranged in the emitter circuit of an auxiliary transistor whose base is connected to a periodically chargeable and dischargeable capacitor. A regulation of at least one output voltage is preferably provided by underlying voltage regulation in combination with a current-dependent inductance. The switching regulator can be advantageously employed as a feeding apparatus in electrical communications transmission technology.

20 Claims, 3 Drawing Sheets

SWITCHING REGULATOR HAVING AT LEAST ONE REGULATED OUTPUT VOLTAGE

BACKGROUND OF THE INVENTION

The present invention is directed to a switching regulator having at least one regulated output voltage.

A switching regulator is disclosed in U.S. Ser. No. 941,448 filed Oct. 26, 1992. In this switching regulator, a device for peak value current limitation is provided, whereby a comparator has one input connected to a reference voltage and the other input connected to a current-measuring resistor. A delta voltage source is arranged in series with the current-measuring resistor.

The delta voltage source supplies an external, synchronous delta signal that is superimposed on the current-meter voltage. Such a superimposition of an external, synchronous delta signal, (disclosed in German Published application 26 13 896) is advantageous in the evaluation of the current-meter voltage with the use of a comparator. On one hand, a defined switch criterion is acquired; on the other hand, the stability in the sub-harmonic range is enhanced.

In a version of the known converter, the multiplier resistor simultaneously serves as actual value generator of a current regulator having superimposed voltage regulation, whereby the actual value of the voltage is the rated value of the current regulation. In such a current mode regulation, a current signal, that serves as turn-off criterion for the pulse duty control, is necessary that is made available to the control circuit as voltage drop-off across a current-measuring resistor or as load voltage of a current transformer.

European reference EP 0 302 433 A1 discloses that forward converters or reverse converters should be provided with current-dependent magnet component parts, for example with what are referred to as non-linear inductors whose inductance decreases with decreasing DC load.

In the reverse converter, a storage transformer having a current-dependent ferrite core effects a noticeably extended current conduction time in the secondary circuit given a weak load. This improves to a considerable extent various properties of the converter, particularly the smallness of the superimposed alternating voltage and the radio interference suppression.

In the forward converter, use of current-independent storage inductors in the low-ass filter that forms the average value is expedient when, for example, a gap-free operation is to be avoided given a great load range and a plurality of output circuits. Such a current-dependent magnet component part also allows extremely low thresholds, so that the internal losses in the current supply device can be kept low.

When a converter is only slightly loaded at the output, then there is a comparatively small voltage drop across the current-measuring resistor. When the level of the current-meter voltage serving as a turn-off criterion is selected so high that an adequately exact turn-off is guaranteed given low-load operation, there is a correspondingly high dissipated power at the current-measuring resistor given maximum nominal load.

In order to utilize the advantages of a magnet component part having current-dependent inductance in combination with the advantageous voltage regulation with underlying current regulation (current mode regulation), then the problem arises that the current-meter voltage and the chronological rise of the current-meter voltage given low load is even lower than when a current-independent inductance is used.

SUMMARY OF THE INVENTION

It is an object of the present invention to provide an improved switching regulator and associated delta voltage source. In particular, the delta voltage assures a stable switching mode given a forward and/or reverse converter with voltage regulation on the basis of underlying current regulation (current mode regulation) in combination with a magnetic component part having current-dependent inductance in a relatively broad load range.

In general terms the present invention is a switching regulator having a power switch arranged in a main circuit of the primary side in series with a current-measuring resistor. A control circuit contains a pulse generator and a pulse-duration modulator connected thereto and outputs a sequence of turn-on pulses, that drives the power switch into conduction, to the control terminal of the power switch. A comparator has one input connected to the current-measuring resistor via a ramp voltage source. The ramp voltage source contains an auxiliary transistor that has its emitter operatively connected to a further resistor arranged in series with the current-measuring resistor. The base of the auxiliary transistor is connected to a capacitor to which at least one discharge current branch containing a charging current path that connects to a DC voltage source and an electronic switch. The electronic switch of the discharge current branch is controllable with the control circuit such that it is non-conductive over the duration of the turn-on pulses and is driven into conduction at least during a prescribed part of the turn-on pulse pauses. The one input of the compactor is connected to the further resistor.

In an advantageous development of the present invention an additional resistor is arranged between the further resistor that is in series with the current-measuring resistor and the emitter of the auxiliary transistor. The value of the additional resistor is greater than the value of the further resistor. The additional resistor arranged in the emitter lead of the auxiliary transistor defines the current with which the current-measuring resistor is additionally charged. The additional resistor allows the voltage with which the base of the auxiliary transistor is charged to be selected so high that parameter modifications of the auxiliary transistor have practically no influence.

A capacitor is connected to the junction of the further resistor and the additional resistor and to the reference potential. This RC arrangement serves as a filter element for the current-meter voltage supplied to the comparator.

A first charging current is connected to a fixed DC voltage and a second charging current branch is connected to a voltage source which is the input DC voltage. A plurality of load current branches are provided for the capacitor connected at the input of the auxiliary transistor. Advantageously, the absolute size of the turn-off criterion is independent of the input voltage. In a further development the transistor having its input-collector path in the discharge current branch lies at reference potential at its emitter, has its collector conducted via a resistor to the input voltage and via the discharge resistor to a terminal of the capacitor that is connected to the base of the auxiliary transistor and is conducted via a further resistor to the fixed DC voltage, and has its base connected to a synchronization output of the control circuit. A diode poled in conducting direction for the discharge current is connected in parallel to the resistor connected between the collector of the transistor in the discharge current branch and the base of the auxiliary transistor.

The delta voltage acquired with the delta voltage source can prove expedient in combination with a device for limitation of the momentary current value.

In a further development of the present invention the switching regulator is formed with a device for regulating at least one output voltage by underlying current regulation, whereby the actual value of the output voltage serves as a rated value of the current regulation. This is provided by a voltage comparator which compares an actual voltage value to a rated value. One input of the comparator is connected to the output of the voltage comparator and the other input of the comparator is connected to the current-measuring resistor. This yields a switching regulator with regulation of the output voltage on the basis of underlying current regulation, whereby a stable switching mode is guaranteed with low outlay.

The switching regulator can contain at least one magnetic component part (storage inductor) with current-dependent inductance. In this development, a stable switching mode in a converter having voltage regulation by underlying current regulation in combination with a magnetic component part having current-dependent inductance is assured with measures that are simple to realize.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 2 and 3 are time diagrams for the switching regulator according to FIG. 1 with current-dependent inductance but without delta voltage source, wherein FIG. 2 depicts the chronological curve of the current-meter voltage at maximum load and FIG. 3 depicts the chronological curve of the current-meter voltage given minimum load;

DESCRIPTION OF THE PREFERRED EMBODIMENT

Figure 1:
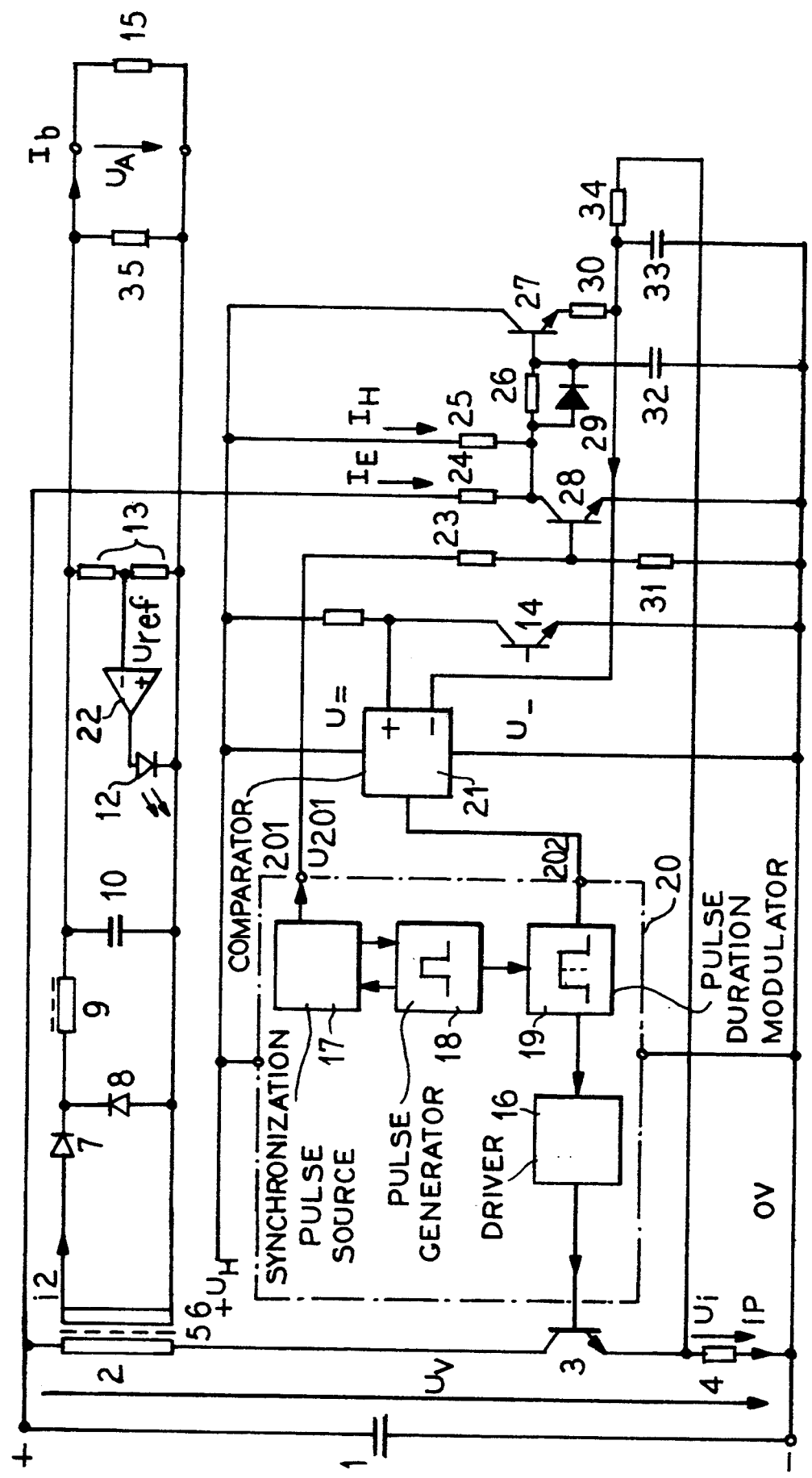
FIG. 1 depicts a switching regulator having regulation of at least one output voltage according to the present invention.

The switching regulator shown in FIG. 1 has its input at the input DC voltage source 1 and supplies the load resistor 15 with the regulated output voltage $U_A$. The main circuit of the switching regulator of the primary side leads from the positive terminal of the input voltage source 1 via the primary winding 2 of the transformer 5 to the collector of the transistor 3 and leads from the emitter of the transistor 3 via the current-measuring resistor 4 to the negative terminal of the input DC voltage source 1.

The rectifier diode 7 is connected between the secondary winding 6 of the transformer 5 and the capacitor 10. The freewheeling diode 8 is arranged in a shunt arm that follows the rectifier diode 7. The inductor 9 is in the series arm between freewheeling diode 8 and the capacitor 10. The output voltage $U_A$ of the switching regulator occurs at the capacitor 10. The resistor 35 that forms a threshold is connected parallel to the capacitor 10. The load resistor 15 which is also connected parallel to the capacitor 10 is supplied with the output voltage $U_A$.

The voltage divider 13 that supplies the actual value for the inverting input of the controlled-gain amplifier 22 is connected parallel to the capacitor 10. The optocoupler diode 12 transmits the actuating signal of the voltage regulator 22 onto the optocoupler transistor 14. The non-inverting input of the voltage regulator 22 is charged with the reference voltage $U_{Ref}$.

The transistor 3 serves as a power switch. The negative terminal of the input voltage source 1 forms the terminal for the reference potential of zero volts.

The control circuit 20 for regulating the output voltage $U_A$ contains the pulse generator 18 and the pulse-duration modulator 19 connected thereto. The control circuit 20 further contains the synchronization pulse source 17 that is connected to the pulse generator 18 and outputs synchronizing pulses to the output 201 of the control circuit 20.

The pulse-duration modulator 19 outputs a sequence of turn-on pulses to the base of the transistor 3 via the driver 16 in the control circuit 20. These turn-on pulses respectively drive the transistor 3 into conduction.

The phototransistor 14 of the optocoupler has one side connected to the reference potential of zero volts and has its other side connected to the non-inverting input of the comparator 21. The comparator 21 has its inverting input connected via the resistor 34 to the current-measuring resistor 4. The output of the comparator 21 is connected to the input 202 of the control circuit 20. The input 202 of the control circuit 20 leads to the control input of the pulse-duration modulator 19.

The comparator 21 compares the momentary value of the voltage drop across the current-measuring resistor 4 to the output voltage of the voltage comparator 22. A voltage regulation with underlying current regulation results therefrom, whereby the actual value of the output voltage is the rated value of the current regulation and which is also referred to as current mode regulation.

The auxiliary transistor 27 supplies an additional current to the current-measuring resistor 4. This current has a ramp-shaped curve. This is achieved in that the auxiliary transistor 21 is connected in emitter circuitry, in that the current-measuring resistor 4 is arranged in the emitter circuit of the auxiliary transistor 27, and in that the base of the auxiliary transistor 27 is connected to a voltage source that supplies a saw-tooth voltage.

The saw-tooth voltage arises at the capacitor 32 that has one terminal connected to the reference potential of zero volts and the other terminal that carries voltage compared to the reference potential of zero volts connected to the base of the auxiliary transistor 27. The collector of the transistor 27 is connected to the auxiliary voltage $+U_H$.

Given a nonconductive transistor 28, the capacitor 32 is charged by means of currents $I_E$ and $I_H$ which flow via the resistors 24 and 25, respectively, to the anode of the diode 29 and from the latter to the capacitor 32 via the diode 29.

The capacitor 32 is periodically discharged by the transistor 28. The discharge current branch proceeds from the base of the transistor 27 via the resistor 26 and the emitter-collector path of the transistor 28 to the negative terminal of the input voltage source 1 to which the emitter of the transistor 28 and the one terminal of the capacitor 32 are connected.

The base of the transistor 28 is connected to a voltage divider that is connected to the output 201 of the control circuit 20 and that is composed of the resistors 23 and 31. The transistor 28 is controllable with the control circuit 20 such that it is nonconductive over the duration of the turn-on pulses that drive the transistor 3 into conduction and is driven into conduction at least during a prescribed part of the turn-on pulse pauses. The transistor 28 is preferably nonconductive during the half period of the clock pulse sequence, whereas the transistor 3 for limiting the pulse-duty factor is likewise inhibited. The resistor 26 is connected between the collector of the transistor 28 and the base of the auxiliary transistor 27. The diode 29 is connected in parallel to the resistor 26. The diode 29 is poled such that it is nonconductive when the transistor 28 is driven into conduction and is conductive when the transistor 28 is nonconductive. In the parallel circuit of diode 29 and resistor 26, the charging current of the capacitor 32 flows through the diode 29 and the discharge current of the capacitor 32 flows through the resistor 26. The parallel circuit of diode 29 and resistor 26 can be replaced by a connection by which the transistor 28 itself can discharge the capacitor 32.

The terminal of the diode 29 connected to the collector of the transistor 28 is connected via the resistor 24 to the positive terminal of the input voltage source 1 and is connected via the resistor 25 to the auxiliary voltage $U_H$. The charging current of the capacitor 32 flowing through the diode 29 is therefore composed of the currents $I_E$ and $I_H$, whereof the current $I_E$ flows through the resistor 24 and the current $I_H$ flows through the resistor 25.

The terminal of the current-measuring resistor 4 that is connected to the emitter of the transistor 3 via the resistors 34 and 30 likewise carries voltage in comparison to the negative terminal of the input voltage source 1 that lies at reference potential. The series circuit composed of the resistors 30 and 34 is arranged between the voltage-carrying terminal of the current-measuring resistor 4 and the emitter of the auxiliary transistor 27. The resistor 30 is connected to the emitter of the transistor 27 and the resistor 34 is connected to the current-measuring resistor 4. The value of the resistor 30 is far higher than the value of the current-measuring resistor 4.

The junction of the resistors 30 and 34 is connected to the reference potential via the capacitor 33. It follows therefrom that a RC arrangement having a resistor 34 connected in a series arm and having a capacitor 33 connected in a shunt arm is arranged between the current-measuring resistor 4 and the resistor 30.

The voltage comparator 21 belonging to the control circuit 20 forms an analog-to-digital converter. The voltage comparator 21 compares the voltage $u_i(t)$ to the setting actuating signal $u_=$ output by the regulator and outputs a turn-off signal "off" in every clock period T for the transistor 3 serving as actuator as soon as the ascending ramp $u_i(t)$ intersects the actuating signal $u_=$.

The ramp of the current-meter voltage $u_i$ is essentially defined by the current-dependent inductance of the storage inductor 9.

It is necessary for reliable operation that this intersection occurs with a specific, minimum slope $du_i/dt$ so that the dead time of the comparator 21 does not become excessively long.

The turn-off criterion must also have a certain minimum size in order to offer the necessary signal-to-noise ratio to the input of the comparator 21.

Given no-load operation and a low input voltage $U_v$, both the amplitude of the current ramp as well as its slope would be too small for a reliable switching operation of the comparator 21 without the ramp voltage source having the auxiliary transistor 27 since the inductance of the current-dependent inductor thereby rises by, for example, a factor of approximately 20. On the other hand, the induction boost becomes smaller given a low input voltage $U_v$. Both of these together result therein that the comparator 21 has a turn-off criterion available to it that is approximately 40 times smaller than in nominal mode.

Figure 2:
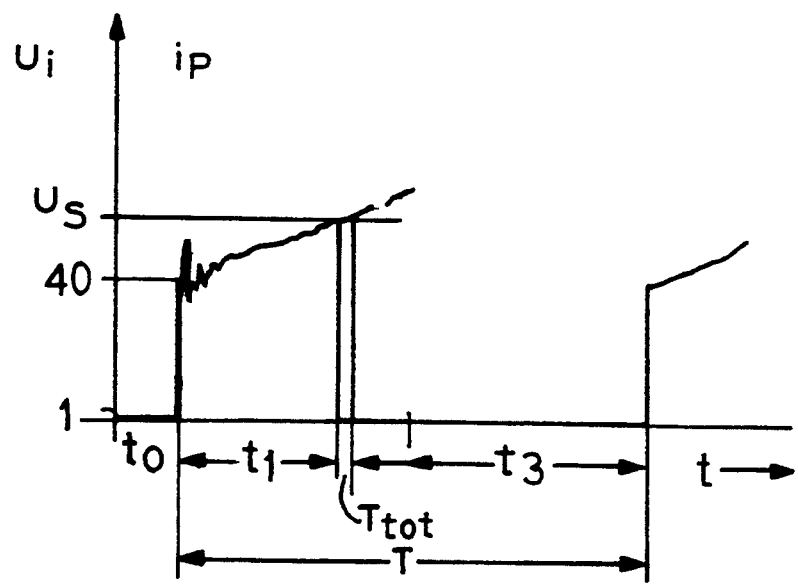
Figure 3:
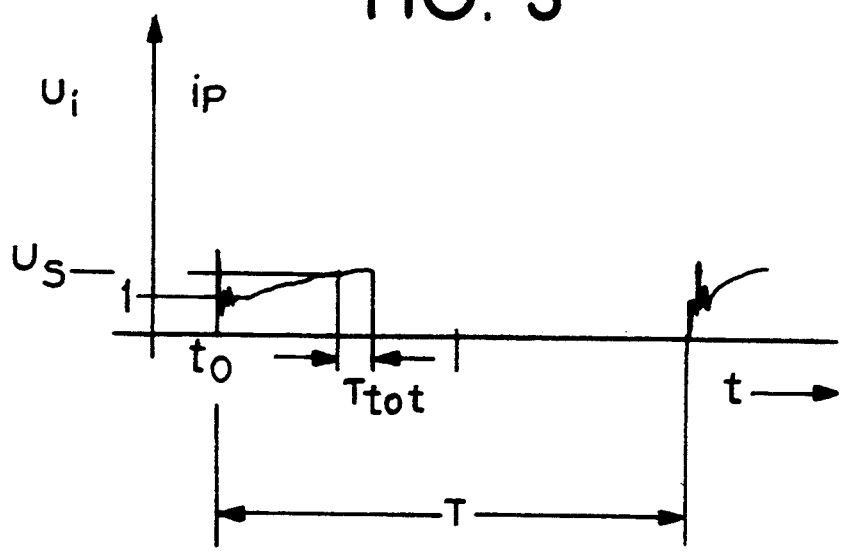

FIGS. 2 and 3 show the chronological curve of the input current $i_p$ for the DC converter and the voltage drop across the current-measuring resistor 4 for that case wherein the inductor 9 has a current-dependent inductance and the delta voltage source is not present.

According to FIG. 2, the current $i_p(t)$ has a defined initial value given maximum output power P upon turn-on, i.e. at time $t_o$, this initial value causing the corresponding voltage drop $u_i(t)$ across the current-measuring resistor 4. During the time span $t_1$, the current $i_p$ rises until the voltage $u_-$ which is derived from the current $i_p$ or from the voltage $u_i$ and is present at the inverting input of the comparator 21, exceeds the comparison value $U_=$ at the non-inverting input. After the lapse of a certain dead time $T_{tot}$, the comparator 21 outputs an "off" signal that initiates the nonconduction of the transistor 3.

The ramp with which the current $i_p$ rises derives from the magnetization components or magnetization currents of the transformers 5 and of the storage inductor 9. FIG. 2 shows that the size and chronological curve of the turn-off criterion provide an unproblematical switching signal for the comparator 21.

FIG. 3 shows the conditions given no-load operation with a larger scale for the current $i_p$ and the voltage $u_i$ than in FIG. 2. Given no-load, i.e. given a current $I_b=0$ output to the load resistor 15, the initial value of the primary current $i_p$ is extremely low.

The current-dependent inductor 9 assumes an inductance that is greater by a factor 20 in no-load. The proportion of the magnetization current of the inductor 9 is therefore likewise low in this operating instance. The peak value therefore also remains low after the expiration of the time span $t_1$. Without delta voltage, this causes an unreliable intersection of the voltage $u_-$ with the comparison value $u_=$ at the input of the comparator 21 and additionally causes a relatively long dead time for the "off" signal. These two factors together yield an unstable switching operation.

By contrast, a delta voltage source is provided for the switching regulator of FIG. 1. The auxiliary transistor 27 is contained in an auxiliary circuit by means of which a ramp-shaped auxiliary voltage is generated. This auxiliary voltage raises the signal-to-noise ratio at the inverting input of the comparator 21 and increases the slope $du_-/dt$ and, thus, the dead time of the comparator 21. The auxiliary voltage forms an additional ramp and provides a useable switching criterion even in those operating ranges wherein the ramp acquired at the multiplier resistor 4 from the current $i_p$ becomes small.

The transistor 17 is connected in emitter circuitry and supplies the defined, ramp-shaped current $i_3(t)$ into the series circuit of the resistors 30, 34 and 4. The voltage $i_3$ causes a voltage drop that forms an auxiliary ramp and superimposes on the voltage $u_i(t)$. Upon condition of $$R30 >> (R34+R4),$$

the current $i_3(t)$ is established by $$i_3(t) = u_3(t)/R30,$$

in a first approximation, whereby R30 is the value of the resistor 30, R34 is the value of the resistor 34 and R4 is the value of the resistor 4. In a preferred embodiment example,
   R4 = 50 m $\Omega$,
   R34 = 100 $\Omega$,
   R30 = 2.7 k $\Omega$.

The voltage $u_{201}$ is taken from the synchronous signal of the control circuit 20 that is preferably an integrated circuit. A synchronization signal whose voltage value is H (high) and L (low) in alternation is available at the synchronous output 201. The voltage value H is present during the half period during which the transistor 3 can be respectively driven into conduction. In the following half, the voltage respectively has the value L.

The ramp-shaped voltage $u_3(t)$ is formed by the flow of aggregate current $I_s$ into the current-measuring resistor 4. As long as the voltage $U_{201}$ at the synchronization output 201 of the control circuit is $U_{201} = L$, the transistor 28 is nonconductive. When the transistor 28 is nonconductive, the capacitor 32 integrates the current $I_s$ to the voltage ramp $u_3$. The equation $u_3(t) = I_s * t_1 * 1/C3$, is thereby valid, where $t_1 = T/2$ and C3 is the capacitance of the capacitor 32.

The voltage $u_{201} = H$ applies during the time span $t_2 = T - t_1$. The transistor 28 is thereby conductive, as a consequence whereof the capacitor 32 is again discharged. The voltage $U_{201} = L$ is again valid in the next clock period and the procedure begins anew.

The current $I_s$ defining the additional ramp is the sum of the currents $I_E$ and $I_H$. The current $I_H$ is derived from a constant auxiliary voltage $U_H$. The current $I_E$ is proportional to the input voltage $U_v$. What is thus achieved is that a ramp having greater steepness is superimposed given a higher input voltage $U_v$, so that the absolute value of the voltage $u_-$ that is of the same magnitude is achieved despite the shorter on-time $t_1$ of the transistor that is thereby established. The absolute value of the turn-off criterion $u_-$ is thereby independent of the input voltage $U_v$. This is of particular advantage for a reliable function of the comparator 21 serving as the analog-to-digital converter.

Figure 4:
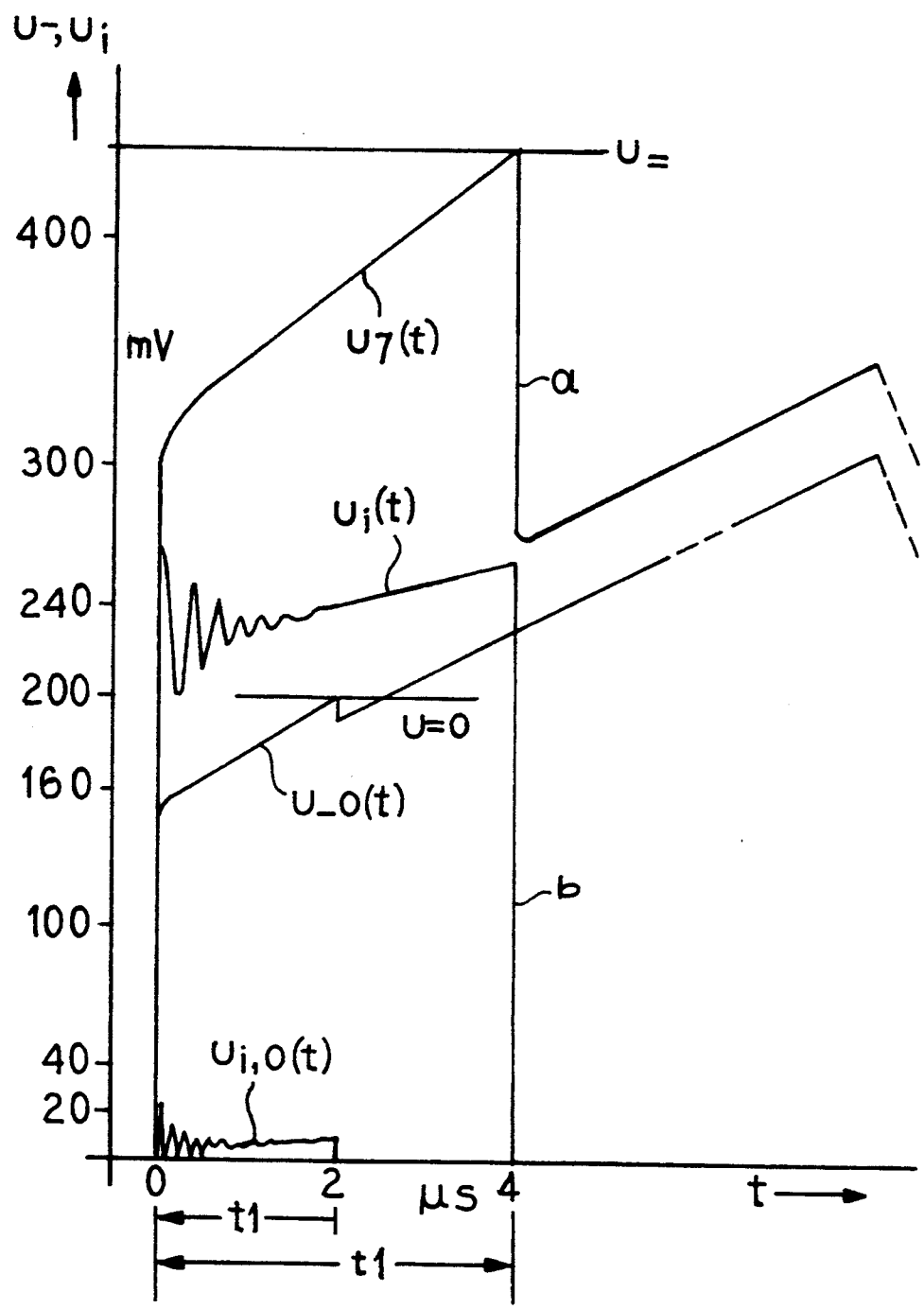
FIG. 4 is a time diagram for the switching regulator according to FIG. 1 having current-dependent inductance.

The diagrams a and b in FIG. 4 illustrate the effect of the auxiliary ramp. According to diagram a, the peak value of the voltage $u_i$ has a size of 260 mV given maximum power P. The effect of the superimposed auxiliary ramp is that the voltage $u_-$ reaches a peak value of 440 mV, as a result whereof an intersection with the comparison value $u_=$ is guaranteed.

Given no-load, P = 0, the peak value of the voltage $u_i$ only has a magnitude of 8 mV and the superimposed disturbances thereon are relatively large. Thus, an unambiguous intersection with $u_=$ cannot be achieved.

The superimposed auxiliary ramp boosts the peak value of the voltage $u_-$ derived here from the voltage $u_i$ to a value of 200 mV and also steepens the ramp rise. An unambiguous intersection with the comparison value $u_{=o}$ and, thus, a reliable, regular switching behavior are thus also reached in this operating instance.

Since the transistor 4 has been shut off at time $t_1$ by the "off" signal, $i_p = 0$ arises and, thus, $u_i = 0$ arises as well. The auxiliary ramp continues to rise until the voltage $u_{201}$ changes to H and the capacitor 32 is discharged. This, however, has no influence on the circuit function.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A switching regulator, comprising:
   a power switch arranged in a main circuit of a primary side of the switching regulator in series with a current-measuring resistor;
   a control circuit having a pulse generator and a pulse-duration modulator connected thereto and an output for outputting a sequence of turn-on pulses to a control terminal of the power switch for driving the power switch into conduction;
   a first comparator having a first input connected to the current-measuring resistor via a ramp voltage source;
   the ramp voltage source having an auxiliary transistor that has an emitter operationally connected to a further resistor that is connected in series with the current-measuring resistor;
   the auxiliary transistor having a base connected to a capacitor that is connected to at least one discharge current branch containing a charging current path connected to a fixed DC voltage source and containing an electronic switch;
   the electronic switch of the discharge current branch being controllable with the control circuit such that the electronic switch is nonconductive over the duration of the turn-on pulses and is driven conductive at least during a prescribed part of the turn-on pulse pauses; and
   the first input of the first comparator connected to the further resistor.

2. The switching regulator according to claim 1, wherein the switching regulator further comprises an additional resistor connected between the further resistor that is in series with the current-measuring resistor and the emitter of the auxiliary transistor, a value of the additional resistor being greater than a value of the further resistor.

3. The switching regulator according to claim 2, wherein the switching regulator further comprises a further capacitor connected between a reference potential and a junction of the further resistor and the additional resistor.

4. The switching regulator according to claim 1, wherein the switching regulator further comprises a first charging current branch connected to a fixed DC voltage and a second charging current branch connected to a voltage source that is an input DC voltage.

5. The switching regulator according to claim 4, wherein the electronic switch is a first transistor having an input-collector path lying in the discharge current branch connected to a reference potential at its emitter side, having a collector connected via a first resistor to the input DC voltage and via a discharge resistor to a terminal of the capacitor that is connected to the base of the auxiliary transistor and is connected via a second resistor to the fixed DC voltage, and having a base connected to a synchronization output of the control circuit, and wherein a diode poled in a conducting direction for a discharge current is connected parallel to the discharge resistor connected between the collector of the first transistor lying in the discharge current branch and the base of the auxiliary transistor.

6. The switching regulator according to claim 1, wherein the electronic switch is a first transistor and wherein a base of the first transistor lying in the discharge current branch is connected to a synchronization output of the control circuit.

7. The switching regulator according to claim 1, wherein the switching regulator is formed with a device for regulating at least one output voltage by underlying current regulation, an actual value of the output voltage serving as a rated value of the current regulation.

8. The switching regulator according to claim 7, wherein the current regulation is provided by a voltage comparator that compares an actual voltage value to a rated value, and wherein a second input of the first comparator is operatively connected to an output of the voltage comparator and the first input of the comparator is connected to the current-measuring resistor.

9. The switching regulator according to claim 1, wherein the switching regulator further comprises at least one magnetic component part with current-dependent inductance.

10. The switching regulator according to claim 9, wherein the magnetic component part is a storage inductor connected in a secondary side of the switching regulator.

11. A switching regulator, comprising:
a power switch arranged in a main circuit of a primary side of the switching regulator in series with a current-measuring resistor;
a control circuit having a pulse generator and a pulse-duration modulator connected thereto and an output for outputting a sequence of turn-on pulses to a control terminal of the power switch for driving the power switch into conduction;
a first comparator having a first input connected to the current-measuring resistor via a ramp voltage source; the ramp voltage source having an auxiliary transistor that has an emitter operationally connected to a further resistor that is connected in series with the current-measuring resistor;
the auxiliary transistor having a base connected to a capacitor that is connected to at least one discharge current branch containing a charging current path connected to a fixed DC voltage source and containing an electronic switch;
the electronic switch of the discharge current branch being controllable with the control circuit such that the electronic switch is nonconductive over the duration of the turn-on pulses and is driven conductive at least during a prescribed part of the turn-on pulse pauses;

the first input of the first comparator connected to the further resistor;
an additional resistor connected between the further resistor that is in series with the current-measuring resistor and the emitter of the auxiliary transistor, a value of the additional resistor being greater than a value of the further resistor; and
a further capacitor connected between a reference potential and a junction of the further resistor and the additional resistor.

12. The switching regulator according to claim 11, wherein the switching regulator further comprises a first charging current branch connected to a fixed DC voltage and a second charging current branch connected to a voltage source that is an input DC voltage.

13. The switching regulator according to claim 12, wherein the electronic switch is a first transistor having an input-collector path lying in the discharge current branch connected to a reference potential at its emitter side, having a collector connected via a first resistor to the input DC voltage and via a discharge resistor to a terminal of the capacitor that is connected to the base of the auxiliary transistor and is connected via a second resistor to the fixed DC voltage, and having a base connected to a synchronization output of the control circuit, and wherein a diode poled in a conducting direction for a discharge current is connected parallel to the discharge resistor connected between the collector of the first transistor lying in the discharge current branch and the base of the auxiliary transistor.

14. The switching regulator according to claim 11, wherein the electronic switch is a first transistor and wherein a base of the first transistor lying in the discharge current branch is connected to a synchronization output of the control circuit.

15. The switching regulator according to claim 11, wherein the switching regulator is formed with a device for regulating at least one output voltage by underlying current regulation, an actual value of the output voltage serving as a rated value of the current regulation.

16. The switching regulator according to claim 15, wherein the current regulation is provided by a voltage comparator that compares an actual voltage value to a rated value, and wherein a second input of the first comparator is operatively connected to an output of the voltage comparator and the first input of the comparator is connected to the current-measuring resistor.

17. The switching regulator according to claim 11, wherein the switching regulator further comprises at least one magnetic component part with current-dependent inductance.

18. A switching regulator, comprising:
a power switch arranged in a main circuit of a primary side of the switching regulator in series with a current-measuring resistor;
a control circuit having a pulse generator and a pulse-duration modulator connected thereto and an output for outputting a sequence of turn-on pulses to a control terminal of the power switch for driving the power switch into conduction;
a first comparator having a first input connected to the current-measuring resistor via a ramp voltage source;
the ramp voltage source having an auxiliary transistor that has an emitter operationally connected to a further resistor that is connected in series with the current-measuring resistor;

the auxiliary transistor having a base connected to a capacitor that is connected to at least one discharge current branch containing a charging current path connected to a fixed DC voltage source and containing an electronic switch;

the electronic switch of the discharge current branch being controllable with the control circuit such that the electronic switch is nonconductive over the duration of the turn-on pulses and is driven conductive at least during a prescribed part of the turn-on pulse pauses;

the first input of the first comparator connected to the further resistor;

an additional resistor connected between the further resistor that is in series with the current-measuring resistor and the emitter of the auxiliary transistor, a value of the additional resistor being greater than a value of the further resistor;

a further capacitor connected between a reference potential and a junction of the further resistor and the additional resistor;

a first charging current branch connected to a fixed DC voltage and a second charging current branch connected to a voltage source that is an input DC voltage;

the electronic switch being a first transistor having an input-collector path lying in the discharge current branch connected to a reference potential at its emitter side, having a collector connected via a first resistor to the input DC voltage and via a discharge resistor to a terminal of the capacitor that is connected to the base of the auxiliary transistor and is connected via a second resistor to the fixed DC voltage, and having a base connected to a synchronization output of the control circuit; and a diode poled in a conducting direction for a discharge current connected parallel to the discharge resistor connected between the collector of the first transistor lying in the discharge current branch and the base of the auxiliary transistor.

19. The switching regulator according to claim 18, wherein the switching regulator is formed with a device for regulating at least one output voltage by underlying current regulation, an actual value of the output voltage serving as a rated value of the current regulation; wherein the current regulation is provided by a voltage comparator that compares an actual voltage value to a rated value, and wherein a second input of the first comparator is operatively connected to an output of the voltage comparator and the first input of the comparator is connected to the current-measuring resistor.

20. The switching regulator according to claim 18, wherein the switching regulator further comprises at least one magnetic component part with current-dependent inductance.

* * * * *